United States Patent [19]
Jones

[11] Patent Number: 5,647,054
[45] Date of Patent: Jul. 8, 1997

[54] SMOKE GENERATOR TUBE

[75] Inventor: Gary Wayne Jones, Joplin, Mo.

[73] Assignee: Pitsco, Inc., Pittsburg, Kans.

[21] Appl. No.: 595,749

[22] Filed: Feb. 5, 1996

Related U.S. Application Data

[63] Continuation of Ser. No. 352,924, Dec. 9, 1994.

[51] Int. Cl.⁶ .............. F22B 29/06; F24H 1/10; F28D 7/12; B05B 1/00
[52] U.S. Cl. .............. 392/397; 392/396; 392/484; 165/155; 239/136
[58] Field of Search .............. 431/208, 210; 239/133, 135, 136; 165/155, 156

[56] References Cited

U.S. PATENT DOCUMENTS

| | | | |
|---|---|---|---|
| 2,576,976 | 12/1951 | Stagner | 392/396 |
| 2,615,215 | 10/1952 | Stagner | 392/396 |
| 3,458,948 | 8/1969 | Curtis et al. | 392/396 |
| 3,563,224 | 2/1971 | Bryer | 392/396 |
| 3,891,826 | 6/1975 | Seuthe et al. | |
| 3,964,304 | 6/1976 | Parrish | |
| 3,990,987 | 11/1976 | Rogers | |
| 4,326,119 | 4/1982 | Swiatosz | |
| 4,330,428 | 5/1982 | Clifford | |
| 4,493,211 | 1/1985 | Weinstein | 73/147 |
| 4,572,943 | 2/1986 | Hogfeldt | 392/396 |
| 4,871,115 | 10/1989 | Heuey | 392/396 |
| 5,265,318 | 11/1993 | Shero | 392/399 |
| 5,344,319 | 9/1994 | Manzke | 73/170.04 |
| 5,471,556 | 11/1995 | Friedheim | 392/399 |

Primary Examiner—Teresa J. Wahlberg
Assistant Examiner—Sam Paik
Attorney, Agent, or Firm—Hovey, Williams, Timmons & Collins

[57] ABSTRACT

A smoke generator apparatus (10) is disclosed which is suitable for use in conducting air flow studies in wind tunnels. The smoke generator apparatus (10) includes a tube assembly (12) which may either be wire-packed or crimped and has fluid flow and heat transfer characteristics which permit the substantially uninterrupted flow of smoke-appearing vapor (82) from the tube outlet (52).

9 Claims, 2 Drawing Sheets

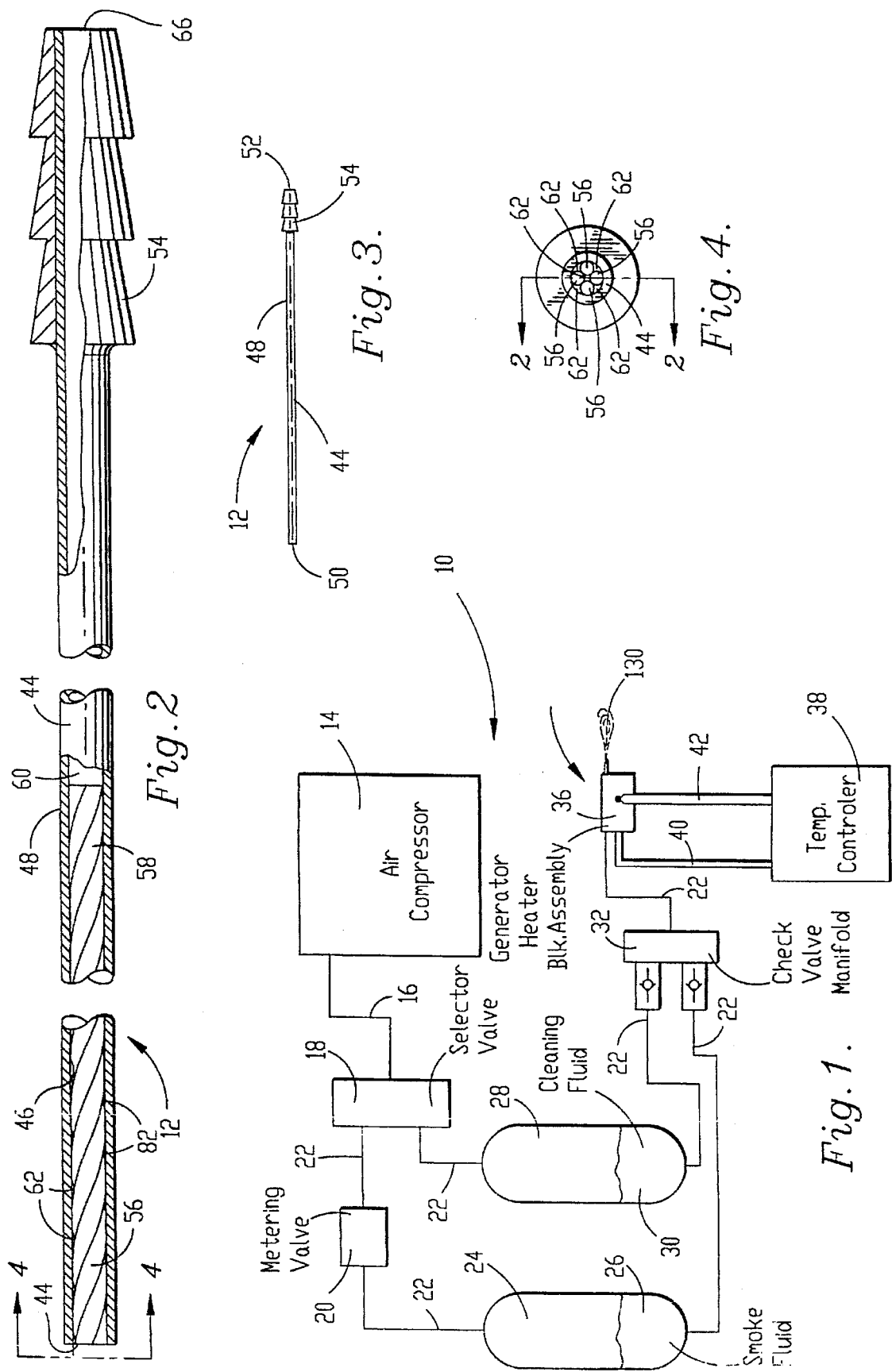

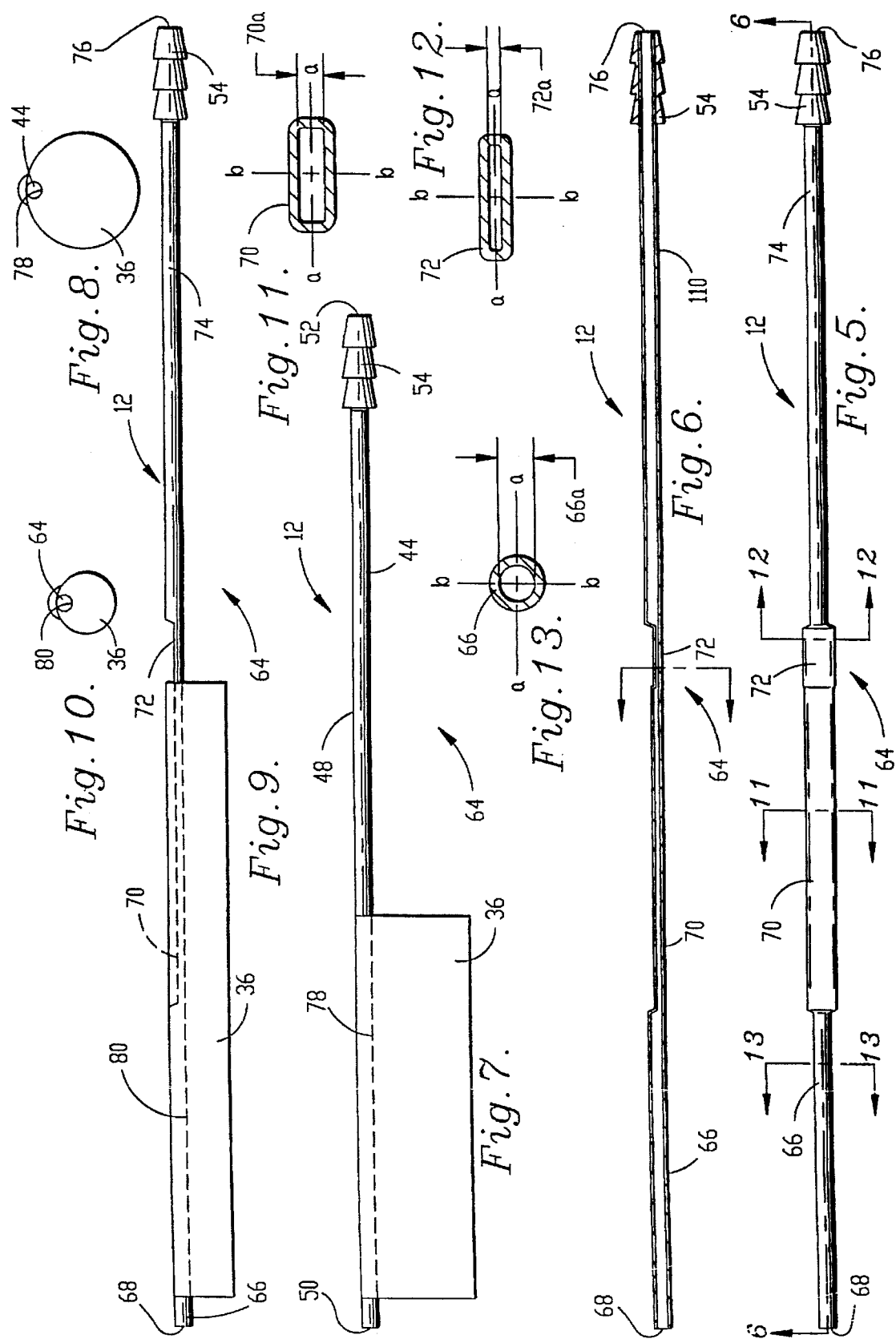

SMOKE GENERATOR TUBE

This application is a continuation of application Ser. No. 08/352,924, filed Dec. 9, 1994.

BACKGROUND OF THE INVENTION

1. Field of the Invention.

The present invention is broadly concerned with an improved compact smoke generator apparatus used for wind tunnel testing. More particularly, it is concerned with a smoke generator device which is improved by provision of a compact, smoke generator tube which is either wire-packed or crimped to certain critical dimensions and in operation produces an uninterrupted flow of smoke.

2. Description of the Prior Art.

A wide variety of smoke generating devices are available in the field of wind tunnel research directed to airflow studies. Such research is typically of the type making use of wind tunnels to determine airflow patterns around scale models, and has thus generated a need for smoke generation devices that are compact and inexpensive. In addition to being compact, such smoke generating devices must also be equipped with sufficient smoke generating capacity to provide visible indication of airflow over a model being tested.

Because of the compact size of such equipment, however, the characteristics of the flow of heat and fluid through the compact equipment are such that resultant smoke discharge is intermittent rather than continuous. This undesirable phenomenon is a persistent problem in the operation of compact smoke generator devices and is sometimes called "puffing". Puffing is believed to be caused by the emission from the smoke generator device of a saturated liquid/gas mixture. (As used herein, the term "smoke" means a vaporized fluid having the appearance of smoke.) In other words, such compact devices often fail to produce a continuous stream superheated vapor (i.e., devoid of liquid) due to inadequate heat transfer and fluid flow characteristics associated with the device.

If puffing occurs during operation of the smoke-generating device, then an additional problem is typically experienced in that some of the liquid entrained in the liquid/gas discharge mixture will be deposited in the form of droplets on the surface of the model being tested in the wind tunnel. Droplet formation on model surfaces during testing tends to distort the airflow over the surface.

In use, if the discharge from a smoke generator is intermittent, or if the smoke discharge causes the formation of liquid droplets on the model surface, the flow characteristics of air over the surface of a scale model cannot be reliably determined. Accordingly, the requirements for a successful, efficient and compact smoke-generating apparatus are relatively stringent with one of the most troublesome difficulties being the emission of intermittent streams of smoke during periods of use.

SUMMARY OF THE INVENTION

The present invention overcomes the problems outlined above and provides an improved smoke generator tube assembly and apparatus. The improved smoke generator tube assembly is provided, in a first preferred embodiment, in the form of a wire-packed, compact tube. The tube is formed of conventional stainless steel tubing (about 0.033 inches ID) and is about three inches long. The wire packing advantageously comprises four strands of very fine (No. 28 gauge) nichrome wire, either straight or twisted. The wire packing is inserted within the tube so that it extends from the tube inlet to a distance of about half the length of the tube. A fluid flow conduit through wire-packed portion of the compact tube is defined by an internal tube surface and the wire packing, which conduit communicates the tube inlet with that portion of the tube extending beyond the wire packing. When installed, the wire packing creates a flow restrictor within the compact tube, and also substantially increases the heat transfer surface area which will be contacted by the fluid as it passes through the compact tube assembly.

In a second preferred embodiment, a crimped, compact smoke generator tube is provided with four adjacent sections and, as with the first preferred embodiment, is formed from conventional stainless steel tubing (about 0.033 inches ID). The first tube section comprises an uncrimped portion of the tube, and extends inwardly from the tube inlet and has an internal diameter corresponding to the uncrimped tube (i.e., 0.033 inches). The second tube section is adjacent to the first tube section, and is crimped to between 12 to 20% of the uncrimped tube diameter. The third tube section is adjacent to the second tube section, and is crimped to between 25 to 40% of the uncrimped tube diameter. The fourth tube section is adjacent the third tube section and, like the first tube section, is uncrimped and extends to the tube outlet.

In actual practice, a compact smoke-generating tube assembly of either preferred embodiment is placed in contact with a heater block associated with a conventional smoke generator device, and its inlet is adapted to receive smoke fluid through tubing coupled thereto. As smoke fluid is forced through the compact tube assembly, heat generated by the heater block is transferred through the tubing walls (and through the wire packing, in the case of the first preferred embodiment) to the fluid passing through the tube assembly. The tube assembly, as disclosed herein, when in use, possesses fluid flow and heat transfer characteristics such that a substantially continuous and uninterrupted flow of smoke is emitted from the tube assembly outlet.

BRIEF DESCRIPTION OF THE DRAWINGS

FIG. 1 is a schematic illustration of a smoke generator apparatus of the present invention, showing the use of the preferred smoke generator tube assembly;

FIG. 2 is a fragmented sectional view of the wire-packed embodiment of the preferred tube assembly;

FIG. 3 is a side elevational view of the wire-packed embodiment of the preferred smoke generator tube assembly;

FIG. 4 is a front elevational view of the inlet of the wire-packed embodiment;

FIG. 5 is a top plan view of the crimped tube embodiment;

FIG. 6 is a side sectional view of the crimped tube embodiment;

FIG. 7 is a side elevational view showing a wire-packed tube assembly installed atop a smoke generator heater block;

FIG. 8 is a front elevational view showing the wire-packed tube assembly installed atop a heater block;

FIG. 9 is a side elevational view showing a crimped tube assembly installed atop a smoke generator heater block;

FIG. 10 is a front elevational view of a crimped tube assembly embodiment mounted on a heater block;

FIG. 11 is a front sectional view of the second crimped section of the crimped tube assembly taken along the lines 11—11 of FIG. 5;

FIG. 12 is a front sectional view of the third crimped section of the crimped tube assembly taken along the lines 12—12 of FIG. 5; and FIG. 13 is a front sectional view of the first uncrimped section of the crimped tube assembly taken along lines 13—13 of FIG. 5.

DETAILED DESCRIPTION OF THE PREFERRED EMBODIMENTS

Referring initially to FIG. 1, smoke generator apparatus 10 includes a smoke generator tube assembly 12. Preferred smoke generator apparatus 10 also includes an air compressor 14 (Linear Air Compressor, Model AC 0102), tubing 16 (⅛ in. ID), a selector valve 18 (ADI No. 80-0321-23), metering valve 20 (SME No. NASN-U10-32), tubing 22 (1/16 in. ID), smoke fluid tank 24 (8 oz. plastic bottle), smoke fluid 26 (Rosco Stage & Studio fluid), cleaning fluid tank 28 (8 oz. plastic bottle), cleaning fluid 30 (distilled water), check valve manifold assembly 32 (ADI check valves No. 80-0503-01), and a generator heater block assembly 34, all of which components are assembled as generally shown in FIG. 1. Heater block assembly 34 further comprises a heater block 36, a temperature controller 38, a heater 40 (Watlow Cartridge Heater, 80 W. Code No. E1A51), and a thermal couple 42 (Type K).

Turning now to the smoke generator tube assembly 12 of the instant invention, and referring generally to FIGS. 2–4, the assembly 12 includes tube 44 which is about three inches long and constructed from No. 18 gauge stainless steel tubing. Tube 44 may also be formed of any material of construction suitable for the use described below. The tube 44 has an internal diameter of about 0.033 inches and an outer diameter of 0.050 inches, and includes an inner surface 46 and an outer surface 48. Tube 44 presents inlet 50 and opposed outlet 52. The outer surface of the outlet 52 end of tube 44 is provided with brass hose barbs 54 soldered thereto, as shown in FIG. 2. Tube 44 is provided with wire packing 56 formed from four pieces of No. 28 gauge nichrome wire 56. Wire packing 56 is received within tube 44 adjacent inlet 50 for a distance of about one-half the length of the tube 44. With packing 56 installed in tube 44, assembly 12 presents a packed tube portion 58 and a non-packed tube portion 60. The wire strands of packing 56 are preferably engaged with one another in a twisted relationship, as shown in FIG. 2, or may be straight. Other forms of packing may be used provided that, once installed, such packing presents a flow restriction within the tube 44 (without completely blocking the fluid flow path) and increases the heat transfer surface area which will be contacted by passing fluid.

When the wire packing is installed within tube 44, fluid conduits 62 are formed between the outer surfaces of the wire packing and the tube inner surface 46, as shown in FIGS. 2 and 4. Fluid conduits 62 communicate the tube inlet 50 with the non-packed tube portion 60.

In a second preferred embodiment, smoke generator tube assembly 12 comprises tube 64 having four separate sections, as shown in FIGS. 5 and 6. Tube 64 is constructed from 18 gauge stainless tubing (0.033 ID×0.050 OD) and is about four inches long. As with the first embodiment, tube 64 may be formed of any material construction suitable for the use described below. A first section 66 is uncrimped and extends from inlet 68 inwardly about one inch, and has an internal diameter 66a (as show in FIG. 13) of about 0.33 inches. A second crimped section 70 is adjacent to and integral with first section 66 and is about one inch long. Second crimped section 70 is formed by crimping tube 64 such that second section 70 has an internal crimped diameter 70a of about 25 to 40% of the full uncrimped internal diameter 66a, as shown in FIG. 11. As shown in FIG. 6, the internal diameter of section 70 is preferably about 0.023 inches. A third crimped section 72 is adjacent to and integral with second crimped section 70 and is formed by crimping tube 64 such that the third section 72 internal crimped diameter 72a is about 12 to 20% of the full uncrimped internal diameter 66a, as shown in FIG. 13. As shown in FIGS. 6 and 12, the internal diameter 72a is preferably about 0.020 inches. A fourth section 74 is adjacent to and integral with third section 72 and comprises the remaining full, uncrimped portion extending between section 72 and tube outlet 76.

To form second and third crimped sections 70 and 72, respectively, stainless steel tubing is preferably heated to about 1100° F., after which the crimping action may be performed. The tube crimping is conducted at this temperature to minimize the buildup of internal stresses which would otherwise be created in a stainless steel tube crimped at room temperature. If a stainless steel tube is crimped at room temperature to form a tube assembly similar to tube 64 described above, upon the application of heat from heater block 36, it has been discovered that the release of internal stresses can cause sufficient deformation in tube ID of tube 64 such that puffing will occur.

In the alternative, tube assembly 12 may be formed of a plurality of tube portions, provided that at least one intermediately disposed tube portion has a narrower internal diameter. In such a case, the alternative tube assembly 12 may be formed by crimping the intermediate tube section to the desired narrower internal diameter, or may be fabricated by any other means suitable for this intended purpose.

When the first preferred embodiment is used, heater block 36 is constructed of steel or aluminum and tube 44 is pressed into a groove 78 in block 36, as shown in FIGS. 7 and 8. When the second preferred embodiment is used, heater block 36 is constructed of brass and tube 64 is silver-soldered into a groove 80 in block 36, as shown in FIGS. 9 and 10. Groove 80 has an internal diameter of about 0.047 inches to ensure that its internal surface comes into tight contact with the external surface of tube 64.

In operation, when selector valve 18 is set to a smoke position, air compressor 14 causes airflow through metering valve 20 into smoke fluid tank 24. As tank 24 is pressurized, smoke fluid 26 is forced out of the tank 24, and through check valve manifold assembly 32, into tube 44 of the smoke generator tube assembly 12 through tubing 22 which is coupled to inlet 50 of tube 44.

As fluid 26 flows through tube 44, the heater block 36 is heated to about 450° F. by heater 40 and is temperature controlled by controller 38. The temperature in the heater block 36 is measured by thermal couple 42. Once the 450° temperature is established in heater block 36, the heat transferred from block 36 to fluid 26 is at a heat transfer rate sufficient to convert fluid 26 from a liquid into a substantially continuous stream of dense, white vapor 82, which looks like smoke. In the practice of the instant invention, little or no "puffing" is experienced.

The amount of vapor 82 being produced can be controlled by adjusting metering valve 20, which in turn meters the air pressure within smoke fluid tank 24. Typical flow rates of smoke fluid 26 for compact units are typically about 1 cc per minute.

To clean the components of smoke generator apparatus 10, the selector valve 18 is set to a cleaning position, in which position air compressed from the air compressor 14 is directed into cleaning fluid tank 28. Air pressure forces cleaning fluid 30 from tank 28 and tubing 22, check valve manifold assembly 32, and into the inlet 50 of smoke generator tube 44, which removes residue within tube 44 left by smoke fluid 26 as it is converted to vapor 82.

Smoke generator apparatus 10 operates in an identical fashion as that described above when tube 64 is substituted for tube 44.

Without limiting the scope of the invention, it is theorized that the smoke generator tube assembly 12 of the instant invention sufficiently alters the fluid flow and heat transfer characteristics, from that otherwise experienced, such that the vapor 82 is, to varying degrees, superheated when it is released from smoke generator apparatus 10.

I claim:

1. A smoke generator assembly comprising:

a smoke tube assembly including walls defining a tube having an inlet opening, an outlet opening and a passage therebetween, said walls being composed of heat conducting material;

delivery means for delivering a smoke generating liquid to said inlet, the liquid becoming a vapor among sufficient heating; and heating means coupled with the exterior of said tube for heating said walls and thereby any smoke generating liquid in said passage to a temperature sufficient for the liquid to become a vapor, said passage presenting a plurality of tube sections between said inlet and outlet openings, said assembly including wire packing positioned in one of said tube sections between said inlet and outlet openings to present a wire packing section and in contact with the tube walls of said wire packing section for increasing the surface area over which the smoke generating liquid flows for increasing the heat transfer rate between said heating means and the smoke generator liquid, said wire packing including a plurality of strands of wire.

2. The assembly as set forth in claim 1, said heating means being coupled with the tube walls defining said wire packing section.

3. The assembly as set forth in claim 2, said wire packing including a plurality of twisted strands of wire with each of said strands spanning the length of said wire packing section.

4. The assembly as set forth in claim 3, said wire packing means including four strands of 28 gage nichrome wire.

5. The assembly as set forth in claim 1, said heating means including means for heating said tube to about 450° F.

6. The assembly of claim 1, said tube being about 3 inches long.

7. The assembly of claim 1, said tube having an internal diameter of about 0.033 inches and an external diameter of about 0.050 inches.

8. The assembly of claim 7, said tube being about 3 inches long.

9. The assembly of claim 8, said tube being composed of stainless steel.

* * * * *